United States Patent Office 3,430,259
Patented Feb. 25, 1969

3,430,259
PESTICIDALLY ACTIVE 2-TRIFLUOROMETHYL BENZIMIDAZOLES
Geoffrey Tattersall Newbold, Saffron Walden, and Albert Percival, Hauxton, England, assignors to Fisons Pest Control Limited, Harston, Cambridgeshire, England
No Drawing. Filed July 11, 1966, Ser. No. 563,954
U.S. Cl. 260—309.2                                    4 Claims
Int. Cl. C07d 49/42; A01n 9/16

ABSTRACT OF THE DISCLOSURE

Substituted benzimidazoles of the type of 1-benzenesulphonyl-4,5,6-trichloro-2-trifluoromethyl benzimidazole, 1-benzenesulphonyl-5,6 - dichloro-2-trifluoromethyl benzimidazole, 1-methanesulphonyl-4,5,6-trichloro-2-trifluoromethyl benzimidazole, etc. are active as pesticides (e.g., herbicides, insecticides, etc.).

---

The present invention relates to certain substituted benzimidazoles which have been found to possess physiological activity, to their preparation and to agricultural chemical and related compositions containing the same.

It has been found that the substituted benzimidazoles as hereinafter described are active as pesticides in many fields viz as herbicides, insecticides, acaricides, molluscicides, fungicides and bactericides; certain members are highly active as herbicides and insecticides.

Accordingly the present invention is for biocidally active substituted benzimidozoles of the following formula:

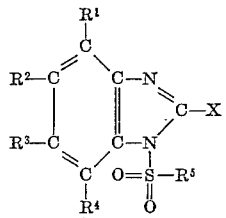

(Formula 1) wherein the above formula $R^1$, $R^2$, $R^3$ and $R^4$ may be the same or different and are selected from the group comprising hydrogen, alkyl (for example of 1–6 carbon atoms such as methyl, ethyl or propyl), hydroxy, alkoxy (for example methoxy, ethoxy or butoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl or 2-methoxyethyl), carboxy, carboxy ester, carboxy amide, N-substituted carboxy amide, N-disubstituted carboxy amide, amino or mono or disubstituted amino (for example methylamino, dimethylamino acetylamino, trifluoroacetylamino, benzenesulphonamido, paratoluenesulphonamido, methanesulphonamido), thiol, alkyl thiol and oxygenated derivatives thereof (for example —$SOR^6$ or —$SO_3R^6$ where $R^6$ is alkyl), sulphonic acid, esters, amides and substituted amides thereof (for example phenylsulphamyl, ethylsulphamyl, chloroethylsulphamyl), and a heterocyclic ring attached to the benzimidazole system through a nitrogen atom (for example morpholino or piperidino), radicals, where X is trifluoromethyl or pentafluoroethyl, and where $R^5$ is alkyl (for example methyl, ethyl, hexyl, decyl or dodecyl), substituted alkyl (for example chloromethyl or bromomethyl), aryl (for example phenyl or naphthyl), substituted aryl (for example tolyl or xylyl), alkenyl (for example allyl, butenyl), substituted alkenyl (for example dichloroallyl), alkynyl (for example propargyl, butynyl), substituted alkynyl (for example chlorobutynyl), aralkyl (for example benzyl, phenylethyl), substituted aralkyl (for example chlorobenzyl, dichlorobenzyl), or heterocyclic (for example pyridyl or thiazolyl).

According to a preferred embodiment, the present invention is for compounds of Formula 1, wherein $R^1$, $R^2$, $R^3$, $R^4$, $R^5$ and X have the significance indicated above but where at least one of the groups $R^1$, $R^2$, $R^3$ and $R^4$ is chlorine, bromine, iodine, fluorine, nitro, amino, alkyl, or trifluoromethyl, suitably also where $R^5$ is alkyl, phenyl or tolyl, and where X is trifluoromethyl.

According to one embodiment of the invention, the substituted benzimidazoles as indicated are prepared by reacting the corresponding benzimidazole derivative unsubsttiuted in the 1-position with a sulphonyl chloride in accordance with the following formula:

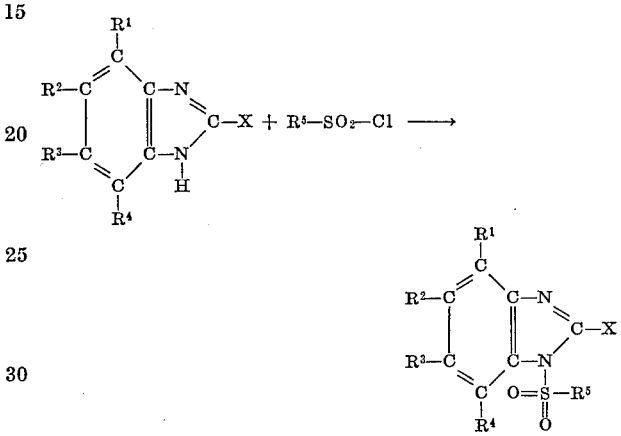

wherein the above formula $R^1$, $R^2$, $R^3$, $R^4$, $R^5$ and X have the significance indicated above, in the presence of an organic base (for example triethylamine), and a solvent (for example acetone).

According to a further embodiment of the invention the substituted benzimidazoles as indicated are prepared by reacting an N-substituted orthophenylene diamine of the formula:

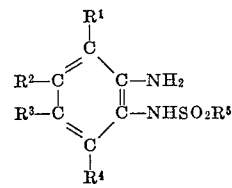

with an acid of the formula X—COOH or a salt or functional derivative thereof wherein $R^1$, $R^2$, $R^3$, $R^4$, $R^5$ and X have the significance indicated above.

The substituted benzimidazole may be incorporated into physiologically active compositions, in any of the usual ways, with or without wetting agents and inert diluents.

If desired the substituted benzimidazoles may be dissolved in a water immiscible solvent, such as for example a high boiling hydrocarbon, suitably containing dissolved emulsifying agents so as to act as a self-emulsifiable oil on addition to water.

The substituted benzimidazoles may also be admixed with a wetting agent with or without an inert diluent to form a wettable powder which is soluble or dispersible in water, or may be mixed with the inert diluent to form a solid or powdery product.

Inert diluents with which the substituted benzimidazoles and salts thereof may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, fatty aromatic sulphonates such as alkylbenzene sulphonates or butyl naphthalene sulphonate, more complex fatty sulphonates such as the amide condensation product of oleic acid and N-methyl taurine or the sodium sulphonate of dioctyl succinate.

The wetting agents may also comprise nonionic wetting agents such as for example condensation products of fatty acids, fatty alcohols or fatty substituted phenols with ethylene oxide, or fatty esters of sugars or polyhydric alcohols, or the products obtained from the latter by condensation with ethylene oxide, or the products known as block copolymers of ethylene oxide and propylene oxide. The wetting agents may also comprise cationic agents as for example cetyl trimethylammonium bromide and the like.

The following examples are given to illustrate the present invention.

EXAMPLE 1

A solution of benzene sulphonyl chloride (9.7 g.) in dry acetone (10 ml.) was added dropwise to a mixture of 4,5,6-trichloro-2-trifluoromethyl benzimidazole (14.5 g. 0.05M), dry triethylamine (7.6 ml.) and dry acetone (45 ml.) at room temperature. After an hour at room temperature the solid was filtered off, washed with acetone and dried. Recrystallisation from dry chloroform gave white hair-like needles of 1-benzenesulphonyl-4,5,6-trichloro-2-trifluoromethyl benzimidazole (18.2 g., M.P. 265–267°).

Found: C, 39.35; H, 1.50; Cl, 24.95; N, 6.70. $C_{14}H_6Cl_3F_3N_2O_2S$ requires: C, 39.14; H, 1.41; Cl, 24.76; N, 6.52%.

EXAMPLE 2

Peas, mustard, linseed, sugarbeet, oats and ryegrass were grown in John Innes potting compost in aluminium pans (7½ ins. x 3¾ ins. area x 2 ins. depth). When the plants had between 2 and 5 true leaves they were sprayed with an aqueous acetone solution of 1-benzenesulphonyl-4,5,6-trichloro-2-trifluoromethyl benzimidazole at a rate corresponding to 10 lbs./acre. After 7 days at 22° C. with 14 hours per day of illumination of 800 ft. candles and relative humidity at 75–90%, the herbicidal damage was assessed visually. This was found to be: Peas 10%, mustard 32%, linseed 35%, oats 3%, sugarbeet 2%, and ryegrass 5%.

EXAMPLE 3

In an analogous manner to Example 1, 1-benzene-sulphonyl-5,6-dichloro-2-trifluoromethyl benzimidazole, M.P. 175–178° C. was prepared from benzene sulphonyl chloride and 5,6-dichloro-2-trifluoromethyl benzimidazole.

EXAMPLE 4

In an analogous manner to Example 1, 1-methane-sulphonyl-4,5,6-trichloro-2-trifluoromethyl benzimidazole, M.P. 178–180° C., was prepared from methane sulphonyl chloride and 4,5,6-trichloro-2-trifluoromethyl benzimidazole.

EXAMPLE 5

A wettable powder formulation was made up as follows:

| | Percent |
|---|---|
| 1-methylsulphonyl-4,5,6-trichloro-2-trifluoromethyl benzimidazole | 25 |
| The sulphonated naphthol/formaldehyde condensation product, wetting agent commercially available as Diapol PT | 5 |
| The sodium salt of a sulphated dodecyl alcohol/ethylene oxide condensation product, wetting agent, commercially available as HOE S2/268 | 1 |
| China clay | 69 |

An aqueous suspension of this wettable powder was sprayed on to copy paper at the base of an insect cage to as to give a deposit of 32 milligrams per square metre of 1-methylsulphonyl-4,5,6-trichloro-2-trifluoromethyl benzimidazole. Adult female mosquitoes (*Aedes aegypti*) introduced into the cages were all killed within 24 hours of contact with the treated paper.

EXAMPLE 6

Aqueous acetone solutions of 1-methanesulphonyl-4,5,6-trichloro-2-trifluoromethyl benzimidazole and of 5,6-dichloro-1-benzenesulphonyl-2-trifluoromethyl benzimidazole were each sprayed onto young cabbage plants at a rate equivalent to 10 kilograms per hectare. When the solvent had evaporated, the plants were infested with second instar larvae of the cabbage-white butterfly (*Pieris brassicae*). Within 24 hours of contact with the treated plants, all larvae were dead.

We claim:
1. A substituted benzimidazole of the formula

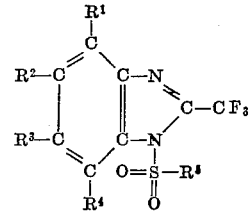

wherein each of $R^1$, $R^2$, $R^3$ and $R^4$ is H or halogen, and $R^5$ is alkyl of 1–12 carbon atoms or phenyl.

2. 1-benzenesulphonyl-4,5,6-trichloro-2-trifluoromethyl benzimidazole.

3. 1-methanesulphonyl-4,5,6-trichloro-2-trifluoromethyl benzimidazole.

4. 1-benzenesulphonyl-5,6-dichloro-2-trifluoromethyl benzimidazole.

References Cited 659,384   8/1965   Belgium.

HENRY R. JILES, *Primary Examiner.*

NATALIE TROUSOF, *Assistant Examiner.*

U.S. Cl. X.R.

71—92; 167—33, 65; 260—247.1, 293.4, 294.8, 302, 556